United States Patent [19]
Budge et al.

[11] Patent Number: 5,708,664
[45] Date of Patent: Jan. 13, 1998

[54] STATISTICAL MULTIPLEXING

[75] Inventors: Michael Richard Joseph Budge, Farnborough; Robert Julian Stedman, Southampton; Jonathan Paul Jordan, Bournemouth, all of United Kingdom

[73] Assignee: Digi-Media Vision Ltd., London, United Kingdom

[21] Appl. No.: 700,877

[22] Filed: Aug. 21, 1996

[30]   Foreign Application Priority Data

Aug. 22, 1995 [GB] United Kingdom ............... 9517130

[51] Int. Cl.$^6$ ............ H04L 12/413; H04J 3/02; H04N 7/12
[52] U.S. Cl. ............. 370/538; 370/465; 348/385
[58] Field of Search ................ 370/316, 319, 370/438, 439, 465, 468, 480, 535, 537, 538; 348/385, 387

[56]   References Cited

U.S. PATENT DOCUMENTS

| | | | |
|---|---|---|---|
| 5,216,503 | 6/1993 | Paik et al. | 348/390 |
| 5,461,619 | 10/1995 | Ciha et al. | 370/468 |
| 5,500,676 | 3/1996 | Tanaka et al. | 348/387 |
| 5,506,844 | 4/1996 | Rao | 370/468 |

*Primary Examiner*—Douglas W. Olms
*Assistant Examiner*—A. Bnimoussa
*Attorney, Agent, or Firm*—Cohen, Pontani, Lieberman, Pavane

[57]   ABSTRACT

A transmitter for transmitting a plurality of digital signals through a plurality of channels, the channels having a predetermined total allocated bitrate, includes a plurality of encoders each associated with one channel, a multiplexer for receiving the encoded digital signals and for transmitting the encoded signals as a stream of data, and operable for adjusting the distribution of the bitrate allocation between and among the encoded signals, and a processing device for providing an indication of a target quality and an actual quality for each channel and for causing the multiplexer to repeatedly adjust the distribution of the bitrate allocation in response to differences between the indicated actual quality and the indicated target quality for each channel so as to equalize differences between the actual and target quality across at least some of the channels. By grouping encoders together in "statistical multiplex groups", and making real time decisions about the bitrate requirements for those encoders, bitrate can be allocated to maximize picture quality for the group. For a variety of different picture sources in a statistical multiplex group, to achieve a target picture quality the bitrate requirements of each will vary with coding difficulty. Thus, a channel within the statistical multiplex group that is experiencing little difficulty in encoding its picture can free bits to channels that are having greater difficulty. The effect is to smooth the picture quality and subjectively improve it.

24 Claims, 5 Drawing Sheets

ALGORITHM PARAMETERS

N       — NUMBER OF ENCODERS IN GROUP
$Q_i$     — QUALITY OF ENCODER i
$Q_{Ti}$    — TARGET QUALITY OF ENCODER i
$B_i$     — BITRATE OF ENCODER i
$B_{TOTAL}$ — TOTAL GROUP BITRATE
$\alpha$       — FIXED SYSTEM PARAMETER

```
BEGIN PROCESS STATMUX GROUP
{
SUMY = 0

/* READ ENCODER QUALITIES AND COMPUTE w */
FOR (i=0; i<N; ++i)
{
  READ ENCODER REPORTED QUALITY Q_i
  SET γ_i = B_i Q_Ti / Q_i
  SUMY = SUMY + γ_i
}
SET w = B_TOTAL / SUMY

/* COMPUTE NEW BITRATES AND SET ENCODER BITRATES */
FOR ( i=0; i<N; ++i)
{
  SET B_NEXTi = (1-α)B_i + γ_i w
  SET ENCODER BITRATE TO B_NEXTi
}
} /* END PROCESS STATMUX GROUP */
```

FIG. 5

STATISTICAL MULTIPLEXING

FIELD OF THE INVENTION

The present invention relates to the transmission of digital signals such as digitally encoded video signals and, more particularly, to the simultaneous transmission of a number of different signals, from different sources, via a single transmission medium.

BACKGROUND OF THE INVENTION

It is well known to multiplex a plurality of signals for transmission via a single transmission medium. In particular for digital systems, this is done by assigning a predetermined proportion of the total bitrate available in the transmission medium to each of the signals that it is desired to transmit. The proportion of the available bitrate assigned to each signal is fixed in each system.

These types of systems are often referred to as Variable Quality Fixed Bitrate systems; FIG. 2 presents an illustration of such a system. The FIG. 2 system includes a number of encoders 20, $20_1$, $20_2$ . . . $20_n$ connected to a Multiplexer (MUX) 22. A video signal is transmitted through each of the encoders such that a plurality of fixed bitrate signals 24, $24_2$ . . . $24_n$ are transmitted to the MUX 22. Each video signal, by way of typical example, constitutes a different television channel. A Multiplex Control Computer (MCC) 26 controls the output from the MUX so that a satellite signal 28 is generated which includes all of the television channels. The satellite signal is then transmitted, via a satellite (not shown), to a receiver station (not shown) which receives the satellite signal and decodes it back into the plural different television channels. The full details of the decoding operations do not form a part of the present invention and are accordingly not described in detail herein.

One problem with such systems is associated with the fact that, in practice, some video pictures require a much higher bitrate than others to achieve acceptable picture quality. In the above-mentioned arrangement, for example, it may be that the signals from some picture sources or television channels cannot be properly encoded using the available bitrate, while others do not require all of the bitrate capacity that is available to them.

In the conventional Fixed Bitrate, Variable Quality system, encoders are allocated a bitrate by the MCC as described above. This bitrate is then fixed for the duration of the MCC schedule. Thus, an encoder in the fixed bitrate system cannot respond to changes in criticality of the source video, as a result of which the picture quality of the decoded output of a fixed bitrate encoder varies with the criticality of the picture material. As the picture material becomes more demanding (i.e. contains more motion and complexity), the picture quality will decrease and the decoded output will contain more encoding artifacts. This is clearly undesirable.

One object of the present invention is to therefore provide a system or arrangement which overcomes at least some of the limitations of known systems.

SUMMARY OF THE INVENTION

In general terms, the present invention provides a method of transmitting a plurality of digital signals through a plurality of channels, the channels having a predetermined total bitrate allocated to them, and the method including the steps of encoding each digital signal, multiplexing the encoded signals, adjusting the distribution of the bitrate allocation between the channels in response to a control system, providing an indication of a target quality for each channel, providing an indication of the actual quality of each channel, and repeatedly adjusting the distribution of the bitrate allocation in response to differences between the indicated actual quality and the indicated target quality for each channel so as to tend to equalize the difference between the actual and target quality across some or all of the channels.

Preferably, the invention further includes the steps of grouping the channels into groups, assigning a bitrate to the group, and varying the individual bitrates of each channel in the group such that the total bitrate of the group approximates the assigned bitrate.

Preferably, and advantageously, the encoding step comprises encoding the digital signals with an encoder having an adjustable bitrate.

Advantageously, the digital signals are digital television signals provided as a data stream representing a plurality of frames, the adjustment of the bitrate is carried out as often as possible (but preferably once every frame), and the actual and target qualities are the actual and target picture qualities.

The present invention thus aims to provide an improved multiplex arrangement, overcoming or at least effectively minimizing the problem in prior art systems as described hereinabove. In principle, by grouping encoders together in what will be termed herein "statistical multiplex groups", and making real time decisions about the bitrate requirements for those encoders, bitrate can be dynamically allocated to maximize picture quality for the group.

The theory is that for a variety of different picture sources in a statistical multiplex grouping, to achieve a target picture quality the bitrate requirements of each will vary with coding difficulty. Thus, a channel within the statistical multiplex group that is experiencing little difficulty in encoding its picture can free bits to channels that are having greater difficulty. The effect is to smooth the picture quality and to subjectively improve it.

In a preferred arrangement, the adjustment of the bitrate of each encoder is determined in relation to an achievable picture quality, the ratio of the achievable picture quality to the target picture quality being the same for each channel.

In accordance with the present invention, there is also provided a transmitter for transmitting a plurality of digital signals through a plurality of channels, the channels having a predetermined total bitrate allocated to them, and including a plurality of encoders (one associated with each channel), a multiplexer for receiving the encoded digital signals and transmitting them as a stream of data and capable of adjusting the distribution of the bitrate allocation between the encoded signals, and processing means for providing an indication of a target quality and an actual quality for each channel and causing the multiplexer to repeatedly adjust the distribution of the bitrate allocation in response to differences between the indicated actual quality and the indicated target quality for each channel so as to tend to equalize the difference between the actual and target quality across some or all of the channels.

In accordance with a further aspect of the present invention, there is provided a statistical multiplexer for a transmitter, including a multiplexer for receiving a plurality of encoded digital signals from a plurality of encoders and for transmitting them as a stream of dam and capable of adjusting the distribution of the bitrate allocation between the encoded signals, and processing means for providing an indication of a target quality and an actual quality for each channel and for causing the multiplexer to repeatedly adjust the distribution of the bitrate allocation in response to differences between the indicated actual quality and the indicated target quality for each channel so as to tend to equalize the difference between the actual and target quality across some or all of the channels.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views:

FIG. 5 is a listing of the statistical multiplex allocation algorithm.

DETAILED DESCRIPTION OF THE PREFERRED EMBODIMENTS

Figure 1:
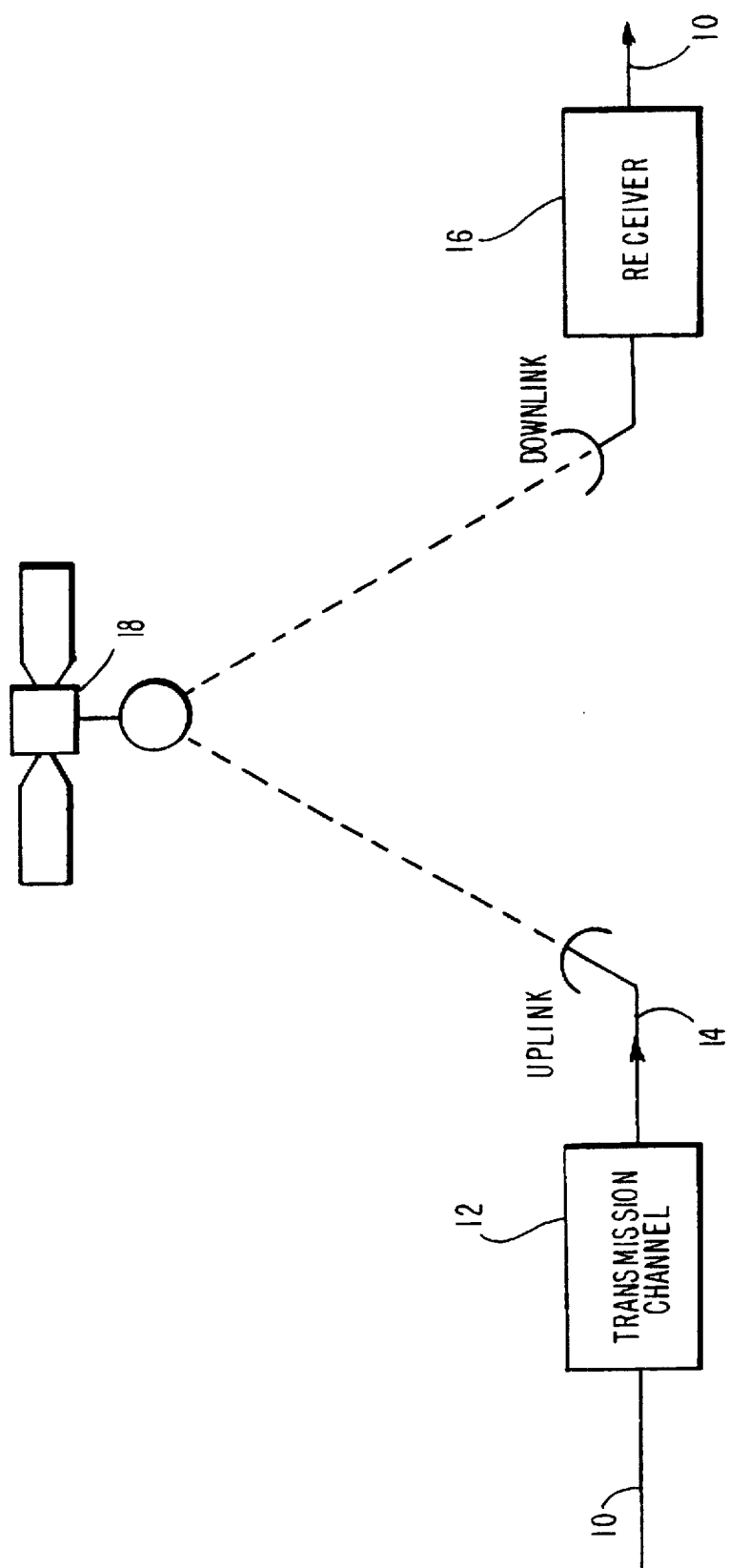
FIG. 1 is a block diagram of a television transmission and receiving system.
Figure 2:
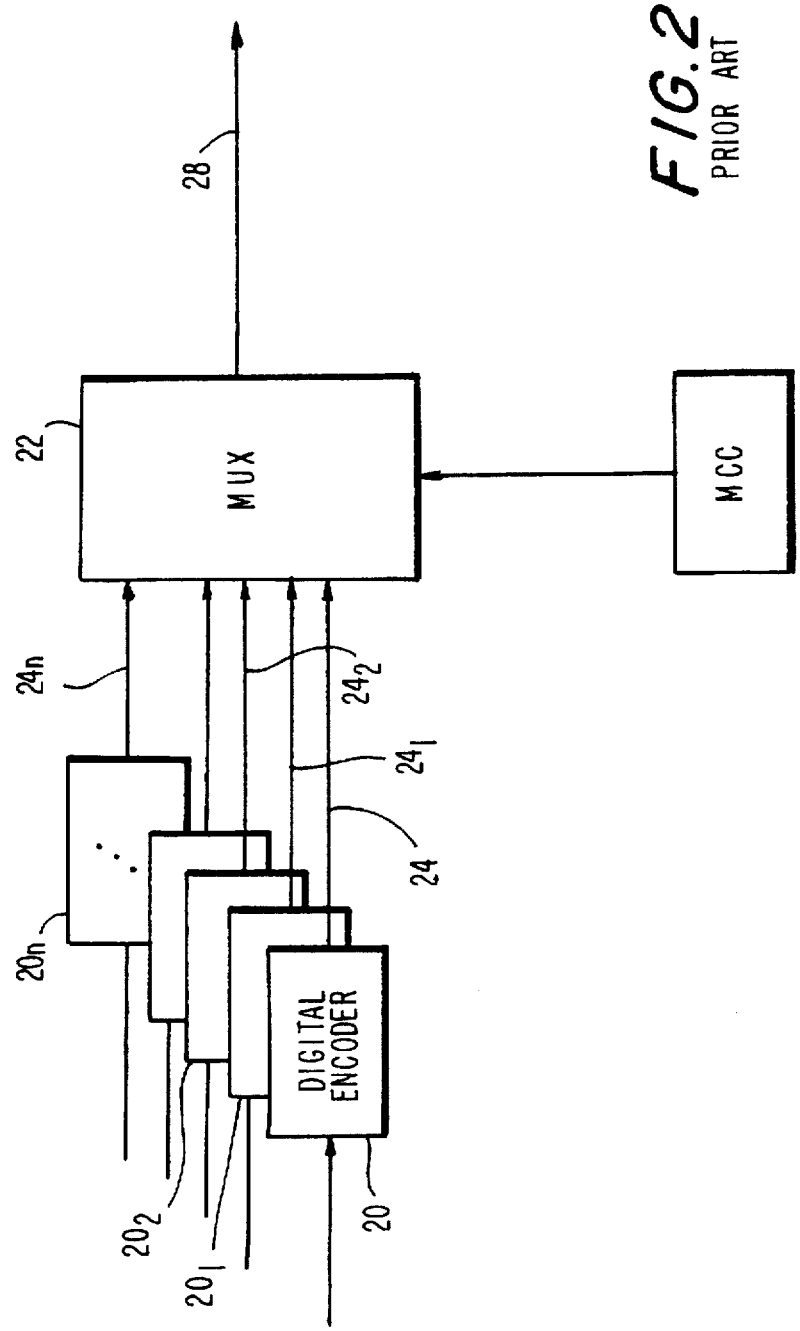
FIG. 2 is a block diagram of a prior art Variable Quality Fixed Bitrate system.

As mentioned hereinabove, the present invention relates to a method and apparatus for transmitting digital television signals through a plurality of transmission channels. FIG. 1 shows a typical transmission and receiving system. A signal 10, such as a video signal, is input into a transmission channel 12, described in additional detail below. The signal undergoes signal processing as it passes through the transmission channel and a transmission signal 14 is generated. The transmission signal is then transmitted to a receiver 16 where it is converted back into, for example, a video signal. This recovered video signal may then be either displayed for viewing or retransmitted to another receiver, if necessary. In the FIG. 1 system, the transmission from the transmission end to the receiver end is by way of a satellite 18 although, as should be apparent, various other means of transmission may alternatively be used in place of satellite transmission.

Figure 3:
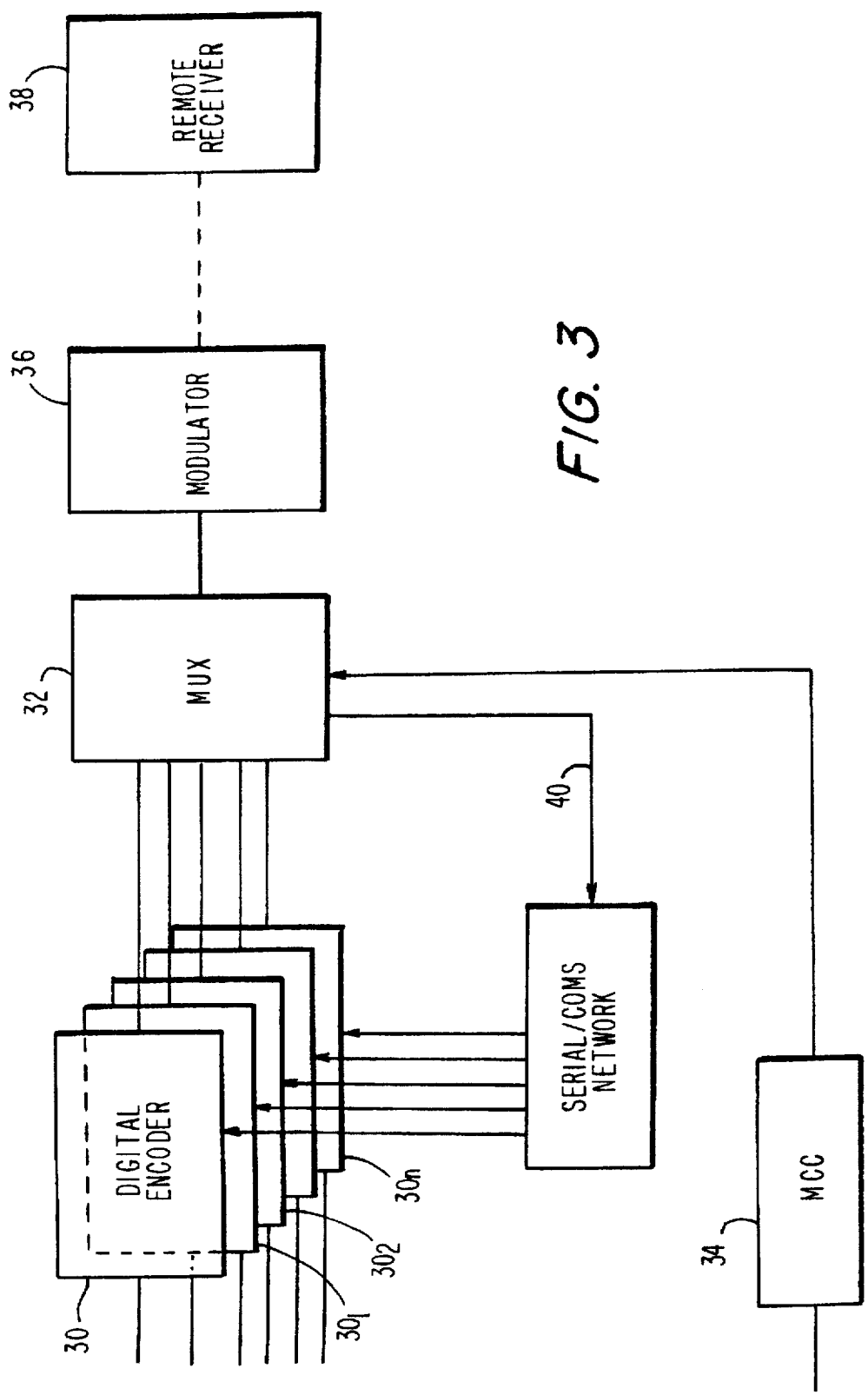
FIG. 3 is a block diagram of an apparatus constructed in accordance with and for implementing the present invention.
Figure 4:
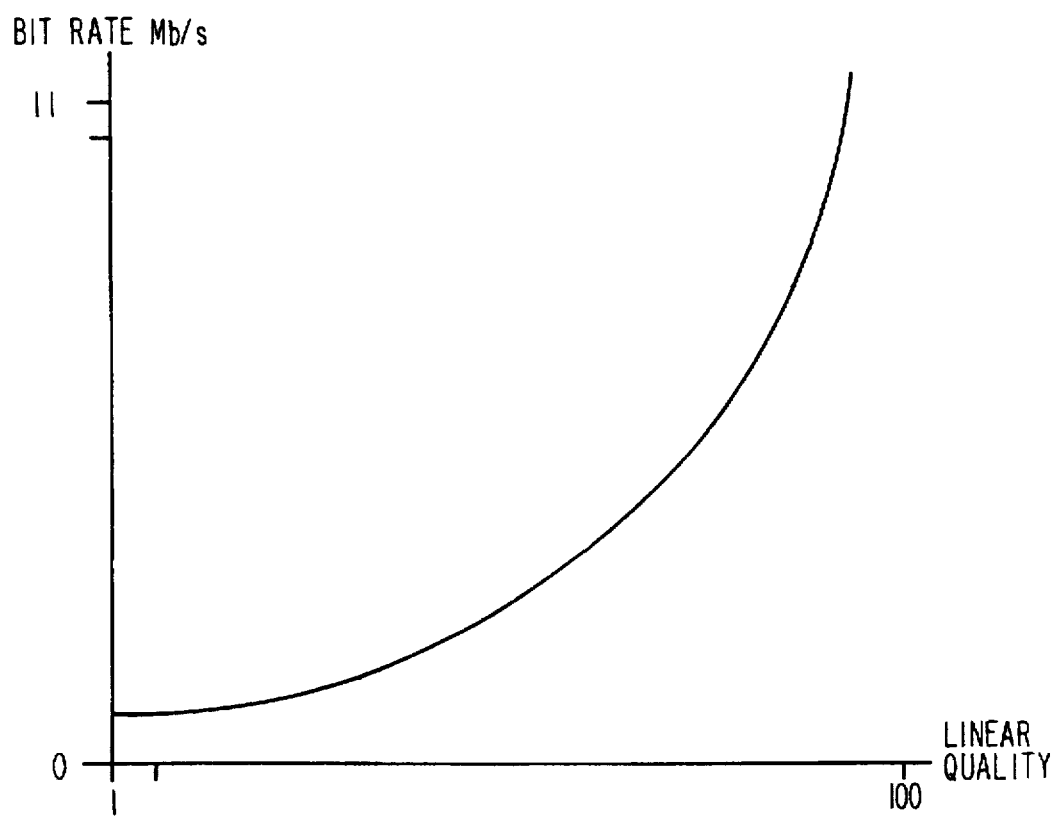
FIG. 4 is a graph of bitrate versus linear quality.

Referring now to FIG. 3, each transmission channel includes a digital encoder. The encoders $30, 30_1, 30_2 \ldots 30_n$ have a combined total bitrate (or group bitrate) allocated to them and a multiplexer 32 is provided to multiplex the digital signals from the encoders. The multiplexer apportions the group bitrate to the individual encoders in such a way as to meet the individual requirements of each encoder at that point in time. This statistically multiplexed system will be referred to herein as a statistical multiplex system. In the preferred embodiment described in detail hereinbelow, a system control unit signals to the multiplexer a linear target picture quality of each channel. This target quality may be determined by the user (or broadcaster), or may be determined statistically or under the control of a Multiplex Control Computer (MCC) 34. The target quality is a measure of the picture quality that the user expects the encoder to achieve. By allocating a higher than average target quality to one of the encoders in the statistical multiplex group, the user is able to attach or associate a preference to that channel over the remaining channels in the group.

Each encoder has a bitrate which is variable for adjusting the linear picture quality in the channel thereof and each encoder includes means to signal to the multiplexer an indication of the linear picture quality in its channel. The multiplexer is operative to poll the encoders interactively to receive or obtain an indication of picture quality from each channel and is connected through a control network for varying the bitrates of the encoders so as to distribute the total allocated bitrate between the encoders. When allocating new bitrates to the encoders, the MUX must ensure that the new bitrate will not infringe any decoder buffer models and does not exceed any bitrate limits specified by the user. Thus, the statistical multiplex system is operative for responding to variations in the criticality of source material, and for adjusting the operation of one or more of the encoders within the statistical multiplex group, so as to optimize operation of the system. The distribution of the total bitrate is such as to tend to equalize the percentage difference between the actual and target linear picture quality for all of its encoders.

In the statistical multiplex system of the invention, the multiplexer is the master and must communicate with the encoders slaved to it as often as possible if variations in picture difficulty are to be fully exploited. To exploit the potential of this invention, bitrate requirements should be re-assessed for each encoder as often as possible. The multiplexer may by way of example communicate with the encoders connected to it via a dedicated fast communications network that connects the multiplexer to each of the encoders.

It is the task of the multiplexer to divide the total available bitrate between the encoders in a statistical multiplex group in such a way as to achieve the target quality of each encoder. The multiplexer then continually assesses the performance of each encoder and dynamically adjusts bitrates to keep the actual quality reported by the encoder as close to the target quality as possible. Other secondary tasks of the multiplexer are:

(i) to keep the system controller or MCC 34 informed on how realistic the target quality figures are for the total available bitrate, i.e. how well the encoders are achieving target quality figures; and (ii) to ensure that maximum and minimum boundaries are not exceeded for each encoder, or that bitrate changes allocated to an encoder do not cause decoder buffer over- or under-flow.

The unit of exchange between the encoder and multiplexer, and the system control computer, must be some measure of picture quality rather than bitrate. A measure of linear quality is required where a quality figure could vary from one to 100, one (i.e. the low end of the linear scale) being a "very poor picture" and 100 (i.e. the upper end of the scale) being "perfect picture quality". Linear quality has been chosen rather than bitrate because:

(a) It is unacceptable for the user to have to understand the subtleties of bitrate versus actual picture quality; and (b) Actual picture quality is affected by many parameters, not just bitrate—e.g. rate of frame cuts.

It should be noted that different channels allocated the same linear quality target figure may have different bitrate requirements.

Once the task of the statistical multiplex system has been completed, the output signal produced by the MUX may be modulated through a modulator 36 to produce a modulated signal which is transmitted to a remote receiver 38. The MUX may communicate with the encoders in order to control their operation by means of a communication network 40.

The mathematics of the Multiplexer Statistical Multiplex Function will now be described in more detail.

The multiplexer polls each encoder i=1 . . . N, for its current picture quality $Q_i$. The quality, target quality $Q_{T_i}$ and the current bitrate $B_i$ are then used to compute new encoder bitrates $B_{NEXT_i}$ with the aim of matching encoder picture quality to the target quality.

The total group bitrate $B_{TOTAL}$ is defined as $$B_{TOTAL} = \sum_{i=1}^{N} B_i \qquad (1)$$

For any given set of channels within a statistical multiplex group, $B_{TOTAL}$ will be constant. However the total bitrate required to achieve the target qualities will in general not be equal to $B_{TOTAL}$. This total bitrate mismatch can be removed by aiming to set the quality of all encoders to some fixed ratio w of their target quality. The ratio w is set such that the sum of the bitrates required to achieve $\omega Q_{T_i}$ for each encoder is equal to the total group bitrate $B_{TOTAL}$. The relationship between the ratio w and the target and actual qualities is derived below.

The encoder bitrate quality relationship is modeled as $$B_i M_i Q_i^{\alpha_i} \qquad (2)$$

The next bitrates are assigned such that the total bitrate $B_{TOTAL}$ is constant, i.e.

$$\sum_{i=1}^{N} B_i + \partial B_i = B_{TOTAL},$$

or alternatively $$\sum_{i=1}^{N} \partial B_i = 0 \qquad (3)$$

The change in bitrate $\partial B_i$ can be written as, $$\partial B_i = \alpha_i M_i Q_i^{\alpha_i-1} \partial Q_i = \frac{\alpha_i B_i}{Q_i} \partial Q_i \qquad (4)$$

but the encoder quality at the next iteration is set to $wQ_{T_i}$; therefore the change in $\partial Q_i$ can be written as $$\partial Q_i = (wQ_{T_i} Q_i). \qquad (5)$$

Substituting (5) into (4) and (3) allows w to be computed as, $$\omega = \frac{\sum_{i=1}^{N} \alpha_i B_i}{\sum_{i=1}^{N} \frac{\alpha_i B_i Q_{T_i}}{Q_i}} \qquad (6)$$

This can be simplified by making the assumption, $\alpha_i = \alpha$ for each encoder, and the variable name substitution $$Y_i = \frac{B_i Q_{T_i}}{Q_i}$$

Thus, the ratio can be written as $$\omega = \frac{B_{TOTAL}}{\sum_{i=1}^{N} Y_i} \qquad (7)$$

and the new encoder bitrate $B_{NEXT_i}$ can be written as $$B_{next_i} = B_i \partial B_i$$

$$B_{next_i} = B_i + \alpha \left( \frac{B_i Q_{T_i}}{Q_i} \omega + B_i \right) \qquad (8)$$

$$B_{next_i} = (1-\alpha) B_i + \gamma_i \omega$$

Thus, the statistical multiplex processing algorithm to update the encoder bitrates for a single statistical multiplex group can be written as for example shown in FIG. 5.

The basic bitrate allocation algorithm has no constraints on the bitrate. The algorithm can be shown to allocate bitrates such that the total group bitrate is a constant, even if an individual encoder is assigned a negative bitrate. Thus, the algorithm needs some constraints on bitrate in order to work. Incorporating bitrate constraints into the algorithm also has the advantage that the operator can specify a permissible bitrate range for each encoder so that the statistical multiplex algorithm must choose bitrates from within this range. An iterative application of the algorithm may be used to assign bitrates within specified limits. The iterative algorithm uses three simple rules:

(1) The encoder bitrate is computed as if unconstrained;
(2) If the new bitrates are outside of the bitrate limits then they are clipped to the limits; and
(3) If bitrate is clipped to the minimum limit, then the bitrate assignment algorithm has less bitrate to assign to other encoders than it assumed (as it couldn't remove bitrate from the clipping encoder due to the lower bitrate limit). Therefore, if any encoder clips bitrate at the lower limit then all non-lower clipping or non-normalizing encoders must be re-assigned bitrates from the remaining bitrate left over.

Where the bitrates allocated undesireably oscillate between high and low values, this problem can be overcome by scaling the bitrate changes down by some factor $\epsilon$ which is chosen to be less than 1. In that instance, the derivation of $B_{NEXT_i}$ is almost the same as that described above, except that all occurrences of $\partial B_i$ are replaced by $\partial B_i \epsilon$.

The table below identifies the variables in the algorithm detailed above.

| Algorithm Variable | Description |
| --- | --- |
| N | number of encoders in statistical multiplex group |
| $B_{TOTAL}$ | total bitrate for statistical multiplex group |
| $B_{TAKEN}$ | sum of bitrates currently assigned to encoders |
| $B_i$ | current bitrate for encoder i |
| $B_{NEXT_i}$ | next bitrate for encoder i |
| $Q_i$ | current quality for encoder i |
| Encoders Assigned | number of encoders with assigned bitrates |
| Encoders To Be Assigned | number of encoders |
| U | set of encoder numbers for encoders with unassigned bitrates |
| $B_{MAX-MCC_i}$ | MCC defined maximum bitrate |
| $B_{MIN-MCC_i}$ | MCC defined minimum bitrate |
| $B_{MAX-INST_i}$ | encoder specified maximum instantaneous bitrate without need for renormalizing |
| $B_{MIN-INST_i}$ | encoder defined minimum instantaneous bitrate without need for renormalizing |
| $B_{MAX_i}$ | effective maximum bitrate which is the more stringent of the MCC and encoder limits |
| $B_{MIN_i}$ | effective minimum bitrate which is the more stringent of the MCC and encoder limits |

Further details of examples of algorithms for use in the practice and implementation of the present invention are shown in the Appendix hereto.

In general, the statistical multiplex system will be controlled by the user through the MCC 34. The MCC will allow the user to specify for each encoder connected to the MUX whether the encoder is running statistical multiplex or fixed bitrate. If it is running statistical multiplex, then the user can specify the group to which that encoder is assigned. The user can also set the group bitrates for the statistical multiplex groups and the target qualities for each encoder in a statistical multiplex group. In addition, the user can specify upper and lower bitrates within which limits the individual encoders are constrained. This is an optional limit that will ensure that no one channel is caused to operate at a bitrate that is so low that the picture quality is completely unacceptable. Broadcasters may create new statistical multiplex groups or add or remove encoders from existing groups in a live system. Thus, it will be possible to have a number of statistical multiplex groups operating together and in a broadcasting system. It will be preferable to ensure that no one group has too many channels where long term high bitrates will be needed, so that the system is optimized.

The main advantages of using the inventive statistical multiplex system, as above described, include the following:

a) In a statistical multiplex system, the encoders are able to respond to changing criticality of the source video material, so that the picture quality of the encoder is smoothed. The removal of the peaks of poor picture quality will produce a subjectively better result.

b) A statistical multiplex system removes the burden from broadcasters of producing complex schedules. Even simple material such as 'Talking Heads' News programs can contain critical sections of material such as sports. These critical sections require a much higher bitrate in order for the material to be of acceptance quality to the user. Thus, a statistical multiplex system removes the need for broadcasters to have to predict these sequences and schedule a bitrate change. The statistical multiplex system can respond very quickly to changes in the material being transmitted.

c) The statistical multiplex system exploits the non-linearity in the relationship between bitrate and picture quality, such that several normally low bitrate channels can benefit significantly during lulls in demand on a high bitrate channel.

d) In a fixed bitrate system, significant amounts of bitrate can be wasted by the transmission of stuffing. This will not occur in a statistical multiplex system.

e) Specifying a quality for a channel, rather than a bitrate, will help broadcasters convince advertisers and program makers that their material is receiving fair treatment regardless of which channel it is on. Since the statistical multiplex system preferably reacts on a frame by frame basis, there is little or no chance of critical picture information not being shown at the best possible bitrate available at the time.

f) Seamless bitrate changing functionality is a minimum requirement for an encoder in the statistical multiplex system. Accordingly, a statistical multiplex system may be used in a fixed bitrate manner and still provide advantages and flexibility over prior art fixed bitrate systems.

It will be possible and desireable in certain applications to provide a system with more than one statistical multiplex group and associated circuitry. In such a system, it is possible to 'statistically multiplex' two or more 'statistical multiplex groups' as described herein under the control of the MCC.

It should also be understood that the invention is relevant and applicable to other types of signals than video signals. For example, audio and/or data signals may in some situations require or benefit from statistical multiplexing. In addition, a combination of one or more different types of signal may be processed in accordance with the present invention.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

---

Variable Initialisation

```
Encoders Assigned = 0       /* Initially none of the encoders have been assigned new bitrates */
B_TOTAL=Statistical multiplex Group Bitrate    /* total bitrate assigned to statistical multiplex group */
B_TAKEN=0                   /*as yet no bitrate has been assigned to encoders */
U = {0,1,2, . . ., N-1}     /*set of encoders with unset bitrates, initially U includes all encoders */
μ = αε                      /* α is approx. 2 and ε << 1, therefore μ in the range 0.1 to 0.5 is suitable */
                            /* The value of ε effects the damping of the bitrate assignments - if is low then */
                            /* encoder bitrates changes occur over a longer time. */
for (i=0;i<N;++i)
{
    send status request to encoders
    read status response data from encoder, i.e.
        B_MAX_INST_i,
        B_MIN_INST_i,
        B_i,
        Q_i,
        RenormFlag;
    /*set B_MAX_i and B_MIN_i to be the more stringent of the bitrate limits */
    set B_MAX_i = Minimum(B_MAX_INST_i, B_MAX_MCC_i)
    set B_MIN_i = Maximum(B_MIN_INST_i, B_MIN_MCC_i)
    /* compute γ_i, which is a useful ratio for bitrate assignment */ set γ_i = (B_i Q_T_i) / Q_i if(RenormFlag_i)
```

```
        {
                State_i=RENORMALISING                  /* encoder state is renormalising, hence bitrate is assumed */
                B_{next_i} = B_i                        /* to be set to its highest value */
                B_TAKEN = B_TAKEN + B_{next_i}          /* add bitrate taken by this encoder to B_TAKEN */
                EncodersAssigned = EncodersAssigned + 1 /* increment number of encoders with assigned bitrates */
                Remove i from set U                     /* take encoder out of set of encoders with unset bitrates */
        }
        else
        {
                State_i = NOTSET                        /* encoder state is bitrate not set (as yet) */
        }
}       /* end for loop */
```

Bitrate Assignment

```
/* now encoder parameters have been read and all renormalising encoders have had their bitrates set */
/* enter loop to set bitrates of all remaining encoders i where i ⊂ U */
do
{
        LowerClippedFlag = FALSE      /* initialise flag indicating encoder bitrate B_{next_i} < B_{MIN_i} */
        UpperClippedFlag = FALSE      /* initialise flag indicating encoder bitrate B_{next_i} > B_{MAX_i} */
```

$$w = \frac{B_{TOTAL} - B_{TAKEN} - (1-\mu) \sum_{i \in U} B_i}{\mu \sum_{i \in U} \gamma_i} \quad \text{/* compute W for encoders with NOTSET state */}$$

```
        set EncodersToBeAssigned=N-EncodersAssigned  /* get copy of number of encoders to be assigned bitrates */
        for(i=0;i<N;++i)
        {
                if(EncoderState_i==NOTSET)
                {
                        /* compute bitrate to assign to encoder */
                        if (EncodersToBeAssigned > 1)
                        {
                                B_{next_i} = (1 - μ)B_i + wμγ_i     /* compute new bitrate */
                        }
                        else
                        {                                          /* as encoder is last one to have bitrates set */
                                B_{next_i} = B_TOTAL - B_TAKEN     /* assigned all remaining bits to this encoder */
                        }
                        /* now check bitrate against limits */
                        if (B_{next_i} > B_{MAX_i})
                        {
                                B_{next_i} = B_{MAX_i}             /* clip bitrate against B_{MAX_i} */
                                UpperClippedFlag = TRUE            /* note fact that allocated bitrate has been limited */

EncoderState_i=UPPERCLIPPED        /* record encoder state */
                                B_TAKEN = B_TAKEN + B_{next_i}     /* add bitrate taken by this encoder to B_TAKEN */

EncodersAssigned=EncodersAssigned+1 /* inc number of encoders with assigned bitrates */

Remove i from set U                /* take encoder out of set of encoders with unset */
                        }
                        else if (B_{next_i} < B_{MIN_i})
                        {
                                B_{next_i} = B_{MIN_i}             /* clip bitrate against B_{MIN_i} */
                                LowerClippedFlag=TRUE              /* note fact that allocated bitrate has been limited */

EncoderState_i=UPPERCLIPPED        /* record encoder state */
                                B_TAKEN = B_TAKEN + B_{next_i}     /* add bitrate taken by this encoder to B_TAKEN */

EncodersAssigned=EncodersAssigned+1 /* inc number of encoders with assigned bitrates */

Remove i from set U                /* take encoder out of set of encoders with unset */
                        }
                        else
                        {
                                /* even though a bitrate has been assigned still treat the encoder state as NOTSET */
                                /* If bitrates must be re-assigned due to bitrate limiting in other encoders leaving */
                                /* a surplus or deficit bitrate-then this bitrate must be re-assigned therefor it is still */
                                /* considered as NOTSET */
                                EncoderState_i=UPPERCLIPPED         /* record encoder state */
                        }
                        EncodersToBeAssigned=EncodersToBeAssigned - i  /* account for encoder with new bitrate */
                }  /* end of EncoderState == NOTSET */
        }
        /* now bitrates have been assigned to all encoders check to see if bitrate limiting has caused total assigned bitrate differ
```

-continued

```
*/
    /* from available group bitrate. If so then some of the encoder bitrates must be re-assigned */
    if(LowerClippedFlag)
    {
        for(i=0;i<N;++i)
        {
            /* if an encoder has lower clipped its bitrate then less bitrate can be taken from this encoder than */
            /* was assumed-this can lead to encoders being assigned too much bitrate ie B_TAKEN > B_TOTAL */
            /* To avoid this all non lower clipped and non renormalising encoders must be re-assigned */
            /* bitrates from what is left over after the lower clipped encoders and renormalised encoders */
            /* have been assigned new bitrates (no . . . I don't understand it either?) */
            if (EncoderState_i!=LOWERCLIPPED&&EncoderState_i!=RENORMALISING)
            {
                if (EncoderState_i==UPPERCLIPPED)
                {
                    EncoderState_i=NOTSET
                    B_TAKEN = B_TAKEN - B_next_i
                    EncodersAssigned = EncodersAssigned - 1
                    Add i back into set U
                }
            }
        }
    }
}
white(LowerClippedFlag || UpperClippedFlag)   /* re-assign bitrates until there is no bitrate limiting */
```

What is claimed is:

1. A method of transmitting a plurality of digital signals through a plurality of channels, the channels collectively having a predetermined total allocated bitrate, the method comprising:

encoding each of the plural digital signals to produce a plurality of encoded signals;

multiplexing the plural encoded signals;

adjusting a distribution of bitrate allocation between the plural channels in response to a control system;

providing to the control system an indication of a target quality for each of the plural channels;

providing in the control system an indication of the actual quality of each of the plural channels; and repeatedly adjusting the distribution of the bitrate allocation between and among the plural channels in response to differences between the indicated actual quality and the indicated target quality for each channel so as to substantially equalize the differences between the actual and target quality across at least some of the channels.

2. The method of claim 1, further comprising grouping the plural channels into a group, assigning a bitrate to the group, and varying the individual bitrates of each channel in the group so that a sum of the individual bitrates of the plural channels in the group approximates the assigned bitrate.

3. The method of claim 1, wherein the encoding step comprises encoding the digital signals with an encoder having an adjustable bitrate.

4. The method of claim 1, further comprising providing the digital signals as digital television signals.

5. The method of claim 4, further comprising providing each of the digital television signals as a data stream representing a plurality of frames.

6. The method of claim 5, further comprising carrying out the repeatedly adjusting step at least once every frame.

7. The method of claim 1, wherein the steps of providing an indication of actual and of target quality respectively comprise providing an indication of actual picture quality and of target picture quality.

8. The method of claim 7, further comprising defining for each said channel an achievable picture quality, and wherein said repeatedly adjusting step further comprises defining for each said channel a ratio of the achievable picture quality to the target picture quality for said each channel, and wherein said ratio is at least substantially identical for said plural channels.

9. A transmitter operable for transmitting a plurality of digital signals through a plurality of channels, the channels having a predetermined total allocated bitrate, comprising:

a plurality of encoders, one of said encoders being associated with each of the plural channels for receiving a digital signal and for providing an encoded digital signal;

a multiplexer for receiving the encoded digital signals and for transmitting the encoded signals as a stream of data, and operative for adjusting a distribution of bitrate allocation among and between the plural encoded signals; and processing means for defining a target quality and an actual quality for each channel and for causing the multiplexer to repeatedly adjust the distribution of the bitrate allocation in response to differences between the actual quality and the target quality for each channel so as to substantially equalize the differences between the actual and target quality across at least some of the channels.

10. The transmitter of claim 9, wherein said plurality of encoders define an encoder group to which an assigned bitrate is assigned, and wherein said processing means is operative for causing the multiplexer to vary the individual bitrates of each said encoder in the group so that a sum of the individual bitrates of the plural encoders in the group approximates the assigned bitrate.

11. The transmitter of claim 9, wherein each said encoder has an adjustable bitrate.

12. The transmitter of claim 10, wherein the assigned group bitrate requires a maximum achievable input to the multiplexer.

13. The transmitter of claim 10, wherein said processing means is further operative for causing the multiplexer to individually control each said encoder in the group to provide, for a respective one of the channels, a quality as close as possible to the target quality for the respective channel and without compromising the actual qualities of the channels associated with others of said encoders in the group.

14. The transmitter of claim 9, wherein the digital signals comprise digital television signals and the actual and target qualities comprise actual and target picture qualities.

15. The transmitter of claim 9, wherein said processing means comprises a multiplexing control computer.

16. The transmitter of claim 15, wherein said processing means further comprises a communications network through which the multiplexer interfaces with said plural encoders.

17. A statistical multiplexer for a transmitter, comprising:
   a multiplexer for receiving a plurality of encoded signals from a plurality of encoders each associated with a signal channel and for transmitting the encoded signals a stream of data, and operable for adjusting a distribution of bitrate allocation between and among the plural encoded signals; and
   processing means for defining a target quality and an actual quality for each channel and for causing the multiplexer to repeatedly adjust the distribution of the bitrate allocation in response to differences between the actual quality and the target quality for each channel so as to substantially equalize the differences between the actual and target quality across at least some of the channels.

18. The multiplexer of claim 17, wherein said processing means is operable for defining a group of the plural encoders, for assigning a group bitrate to the group, and for varying the individual bitrates of each encoder in the group so that the sum of the individual bitrates of the plural encoders in the group approximates the assigned bitrate.

19. The multiplexer of claim 17, wherein each encoder has an adjustable bitrate.

20. The multiplexer of claim 18, wherein the assigned group bitrate comprises a maximum achievable input to the multiplexer.

21. The transmitter of claim 18, wherein said processing means is further operative for individually controlling each encoder in the group to provide for a respective one of the channels a quality as close as possible to the target quality for the respective channel and without compromising the actual qualities of the channels associated with others of said encoders in the group.

22. The multiplexer of claim 17, wherein the encoded digital signals comprise encoded television signals and the actual and target qualities comprise actual and target picture qualities.

23. The multiplexer of claim 17, wherein said processing means comprises a multiplexing control computer.

24. The multiplexer of claim 23, wherein said processing means further comprises a communications network connecting the multiplexer to the plural encoders.

\* \* \* \* \*